(Model.)
A. J. DAYTON.
REST FOR FISHING RODS.
No. 420,592. Patented Feb. 4, 1890.
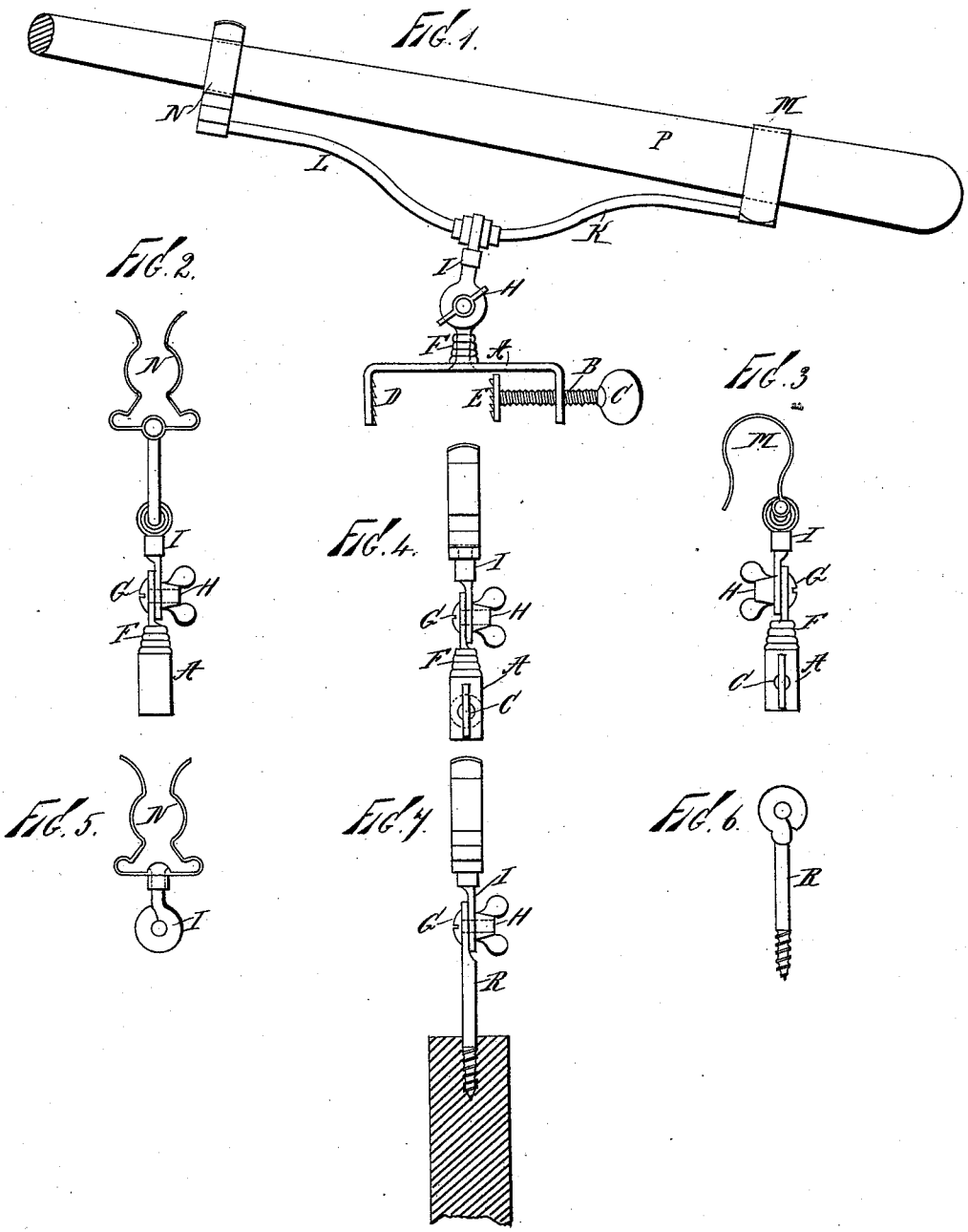
Witnesses:
John Buckle,
C. L. Thomas.
Inventor:
A. J. Dayton,
By D. M. Pierce,
Atty.

UNITED STATES PATENT OFFICE.

AUGUSTUS J. DAYTON, OF BROOKLYN, NEW YORK.

REST FOR FISHING-RODS.

SPECIFICATION forming part of Letters Patent No. 420,592, dated February 4, 1890.

Application filed May 16, 1889. Serial No. 311,032. (Model.)

*To all whom it may concern:*

Be it known that I, AUGUSTUS J. DAYTON, a citizen of the United States, and a resident of Brooklyn, in the county of Kings and State of New York, have invented certain new and useful Improvements in Combined Rests and Supports for Fishing-Poles, of which the following is a specification.

My invention relates especially to devices employed for holding fishing-poles in the desired position while in use, and has for its object the provision of a combined holder and rest, whereby the pole may be supported and held at an angle upon the gunwale of the boat or other suitable or convenient location.

To attain the desired end, my invention consists, essentially, in a base-piece provided with a clamp or holding-screw, said base-piece bearing a swiveled jointed support, made in two parts and provided with a centrally-located set-screw, the upper portion of the support being provided with arms bearing spring-clasping devices for grasping the pole or with a single grasping-yoke instead of said arms, all of which will be hereinafter first fully described, and then pointed out in the claims.

In the drawings, Figure 1 is a side elevation of my device, showing a fishing-pole in place. Fig. 2 is an end elevation looking from the left, and Fig. 3 is a like view from the right. Fig. 4 is a side view of my support, showing a single grasping-yoke in use instead of the arms and clasping devices. Fig. 5 is a side view of said yoke. Fig. 6 shows a perforated screw-shank, to which the arm holder or yoke may be attached. Fig. 7 shows said screw-shank with yoke fixed therein.

Like letters of reference indicate corresponding parts in all the figures.

A is the base-piece, perforated and screw-threaded at B for the reception of a screw C. The base-piece is provided with teeth at D, and the screw C bears a tooth-disk E.

F is a vertical post, swiveled in base-piece A and provided with a perforation for the reception of a screw G, whereon is located a wing-nut H.

I is a perforated standard-bar, adjustably held in place by screw G and nut H. This bar is provided with arms K L, the arm L terminating in a spring-clasp N, and arm K terminating in a clasp-hook M.

When constructed and arranged as above described, the base-piece A may be clamped to the gunwale of a boat or other suitable support, and the arms K L adjusted and held at any preferred angle. A pole P may be placed therein, as illustrated in Fig. 1, the outer portion resting in and being grasped by the yoke N, and the inner portion passing under and being grasped by clasp M. In case a fish strikes, the pole will not be thrown from the supports by rebounding, and the swivel will permit it to turn in the direction of the strain, while at the same time the pole may be easily and quietly removed from the support.

When it is desired to simply let the pole rest upon the support, the butt thereof extending into the boat, the yoke shown in Fig. 5 is substituted for the device above described, and when it is desired to fix the support or rest to a stake, string-piece, or the equivalent the screw-shank R is substituted for the base-piece A, all of the parts being made interchangeable.

My device is light and easy to carry, simple in construction and adjustment, and will be found admirably adapted to the uses and purposes for which it is intended.

What I claim is—

1. The combination, with a base-piece adapted to be secured in place, of a vertical swiveled standard having a horizontally-adjustable standard-bar secured thereto by means of a screw and wing-nut, said adjustable standard-bar being provided with arms, each bearing spring-grasping devices, substantially as shown and described.

2. The combination, with the supporting mechanism, of the arms, one of which is provided with a spring grasping and supporting yoke for supporting a pole from beneath, and the other arm with a grasping-hook for passing over the pole, substantially as shown and described.

3. The combination, with the screw-eye R, of the horizontally-adjustable swiveled spring-grasping support and the wing-nut for securing the adjustable parts, substantially as shown and described.

Signed at New York, in the county of New York and State of New York, this 23d day of April, A. D. 1889.

AUGUSTUS J. DAYTON.

Witnesses:
A. M. PIERCE,
C. L. THOMAS.